(12) United States Patent
Pensar

(10) Patent No.: US 8,310,794 B2
(45) Date of Patent: Nov. 13, 2012

(54) APPARATUS, SYSTEM AND METHOD FOR ELECTRIC POWER SUPPLY

(75) Inventor: Johan Pensar, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 218 days.

(21) Appl. No.: 12/811,678

(22) PCT Filed: Jan. 9, 2009

(86) PCT No.: PCT/FI2009/050014
§ 371 (c)(1),
(2), (4) Date: Jul. 2, 2010

(87) PCT Pub. No.: WO2009/087277
PCT Pub. Date: Jul. 16, 2009

(65) Prior Publication Data
US 2010/0289344 A1    Nov. 18, 2010

(30) Foreign Application Priority Data
Jan. 9, 2008    (FI) .................................... 20085014

(51) Int. Cl.
*H02H 3/18* (2006.01)
(52) U.S. Cl. ............................................. 361/18; 361/86
(58) Field of Classification Search ............... 361/18, 361/85, 86
See application file for complete search history.

(56) References Cited

U.S. PATENT DOCUMENTS

| | | |
|---|---|---|
| 3,370,218 A | 2/1968 | Merz |
| 4,317,049 A | 2/1982 | Schweppe |
| 4,385,241 A | 5/1983 | Peddie et al. |
| 5,111,377 A * | 5/1992 | Higasa et al. .................. 363/95 |
| 5,442,335 A | 8/1995 | Cantin et al. |
| 5,627,744 A * | 5/1997 | Baker et al. .................. 363/165 |
| 6,065,298 A | 5/2000 | Fujimoto |
| 6,121,693 A | 9/2000 | Rock |
| 2004/0117077 A1 | 6/2004 | Kahle et al. |
| 2004/0254688 A1 | 12/2004 | Chassin et al. |

FOREIGN PATENT DOCUMENTS

JP    05336785    12/1993
(Continued)

OTHER PUBLICATIONS

S.Castellan et al., All-Electric Mega-Yachts: Integrated Power System Operation and its Interaction with Propulsion Converters, IEEE, 2006, pp. S40-34 to S40-39.

(Continued)

*Primary Examiner* — Danny Nguyen
(74) *Attorney, Agent, or Firm* — Muncy, Geissler, Olds & Lowe, PLLC

(57) ABSTRACT

The aim of the invention is to reduce the frequency change of a electric network in fault situations so that there is no need for protection operations during relatively short imbalances between electricity production and demand thereof. The aim is achieved by means of an apparatus, system and method for electric power supply according to main claims for directing electric power to the electric motor (7). The apparatus according to the invention monitors the frequency of the network (1). In case the frequency of the network changes sufficiently, the apparatus reacts by changing the amount of electric power directed to the electric motor (7). The electric supply network (1) is provided with an opportunity to change the amount of produced electric energy in a controlled way so that the electric supply network is continuously in operation.

13 Claims, 3 Drawing Sheets

FOREIGN PATENT DOCUMENTS

| | | |
|---|---|---|
| JP | 5336785 A | 12/1993 |
| JP | 11101516 | 4/1999 |
| JP | 11101516 A | 4/1999 |
| JP | 2004153940 | 5/2004 |
| JP | 2004153940 A | 5/2004 |
| JP | 2007159263 | 6/2007 |
| JP | 2007159263 A | 6/2007 |

OTHER PUBLICATIONS

John J. May PE, Improving Engine Utilization on DP Drilling Vessels, Dynamic Positioning Committee, Sep. 16-17, 2003, pp. 1-25.

Juoko Niiranen, Digital Control of an Electromotor Drive, Otatieto, 1999, 35 pages.

* cited by examiner

APPARATUS, SYSTEM AND METHOD FOR ELECTRIC POWER SUPPLY

FIELD OF INVENTION

The present invention relates to an electric power supply for an electric motor. The invention relates especially to an apparatus, system and method designed to direct electric power from electric power network to an converted driven electric motor.

BACKGROUND ART

Electric power is produced by means of generators connected to the electric power transmission network. The transmission network transmits the produced electric power to consumers, such as electric motors, lighting equipment and the like. There is no economic way of storing electric power whereby the produced electric power must be consumed as it is produced. In other words, the amount of consumed energy must match that of produced energy.

Generators are electric motors designed for producing electricity, the rotors of which rotate at a certain speed. Usually the rotation speed of the generators is the same as the frequency of the electric power transmission network. Usually the frequency of the transmission network is 50 Hz. However, as the demand of the electric network fluctuates constantly, i.e. the network is in a dynamic state, the electric network must be able to accommodate a certain amount of imbalance between the produced electric energy and the consumed electric energy. This imbalance can be seen as small fluctuations of the network frequency. The rotating masses of generators and electric motors using electric power can compensate for small and short-duration imbalance situations, because energy is stored in the rotating masses in the form of inertia.

If the imbalance between the production of electricity and the demand of electricity is larger and/or its duration is longer, the network frequency tends to change more. This causes protection operations in the network, such as isolating a part of the network from the rest if the network or connecting reserve power to the network. The purpose of the protection operations is to keep as large a part of the electric power transmission network as possible in use during the fault. For example, if there is a sudden increase of demand in the network with a relatively long duration, the generators can not produce the necessary power as fast as needed and the rotating masses of the motors can not compensate for the increase of demand for a sufficiently long time. Thereby the electric network frequency starts to decrease. Due to the decrease of the frequency a part of t he network is isolated from the rest of the network until the generators can produce the necessary additional power subsequent to which the part of the network can again be connected to the rest of the network. A corresponding operation can take place in case a large generator of the network suddenly shuts down and other generators must replace the production of the non-operational generator. The above-mentioned relates to both the main network and dedicated electric networks, such as the electric network of a marine vessel.

Nowadays frequency converters are used in a number of applications. With a frequency converter the electric power supply can be dimensioned to exactly correspond with the demand of the electric motor or other electrical appliance. For example, a squirrel cage motor of an air blower does not have to be always driven at full speed, if partial rotation speed is sufficient for most of the operation time. By using a frequency converter it is possible provide partial rotation speed and to save a lot of energy.

In a normal frequency converter alternating voltage is converted to direct voltage which is then converted back to another alternating voltage. The second alternating voltage is used for directing electric power to a load, such as an electric motor. The second alternating voltage can also be controlled. The frequency controller drive, however, cuts the direct connection between the electric motor and the production of electricity, whereby the rotation inertia of the electric motor no longer can take part in compensating for smaller load variations in the network. However, the demand of the electric power of the electric motor tends to stay constant for a while regardless of the frequency and phase of the network.

FIG. 1 illustrates an example of an electric network 1 of a vessel having generators 2, 3, 4. Electric motors 7, 8 are connected to the network through motor-specific frequency converters 5, 6. The shafts of the electric motors are connected to the propellers 9, 10 of the vessel. The electric motors of a vessel are large, especially when their power is compared to the size of the electric network of the vessel.

The dedicated electric network of the vessel is relatively small. Due to this, the fault of even one of the generators of the vessel is a considerably serious fault situation and it can be seen as a change of the network frequency. For example, if one of the generators of the vessel becomes faulty, it will take a few seconds before the other generators can compensate for the power of the faulty generator. Usually, diesel-operated motors are used as generators of the vessel. The inertia of the large electric motors located behind the frequency converters 5, 6 can not take part in the maintenance of the network frequency. Thus the electric network 1 easily fails, i.e. protection operations quickly disconnect a part of the network or the whole network. If the network fails, the rotation speed of the propellers 9, 10 decreases. In propeller drive the relation between the rotation speed and the used power is immediate so that even a small change in rotation speed can be clearly seen in the power demand and vice versa. Thus, the maneuverability of a vessel soon decreases due to a fault in the electric network and the vessel stops. In case the duration of network partial power is long enough, the frequency of the network decreases sufficiently to trip the protection operations of the network. In the worst case, the entire network of the vessel must be shut down, whereby the propellers of the vessel no more provide propulsion power and the vessel becomes nearly impossible to steer. This can have catastrophic consequences.

BRIEF DESCRIPTION OF THE INVENTION

The aim of the invention is to reduce the frequency change of a electric network, such as dedicated electric network, in fault situations so that there is no need for protection operations during relatively short imbalances between electricity production and demand thereof. The aim is achieved by means of an apparatus, system and method according to main claims for directing electric power to the electric motor.

The apparatus according to the invention monitors the frequency of the network. In case the frequency of the network changes sufficiently, the apparatus reacts by changing the amount of electric power directed to the electric motor with a converter. Thus, the purpose is to change the amount electric energy consumed towards amount of produced electric energy, whereby the frequency of the network is maintained on the allowed operation range in case of short fault situations.

The method according to the invention monitors the frequency of the network. In case the frequency of the network changes sufficiently, the apparatus reacts by changing the amount of electric power directed to the electric motor with a converter. Thus, the purpose is to change the amount electric energy consumed towards amount of produced electric energy, whereby the frequency of the network is maintained on the allowed operation range in case of short fault situations.

Especially, in case of identified low frequency situation in the electric supply network, the power output of the converter is controlled such, that the power output of the converter is lower than determined by setting signal of the converter.

The electric supply network is provided with an opportunity to change the amount of produced electric energy in a controlled way so that the electric supply network is able to recover in fault situations, without need to disconnect any part of the network.

LIST OF FIGURES

In the following the invention is described in more detail by reference to the figures in the drawing, in which FIG. 1 illustrates an example of the electric supply network of a vessel;

DETAILED DESCRIPTION OF THE FIGURES

Figure 1:
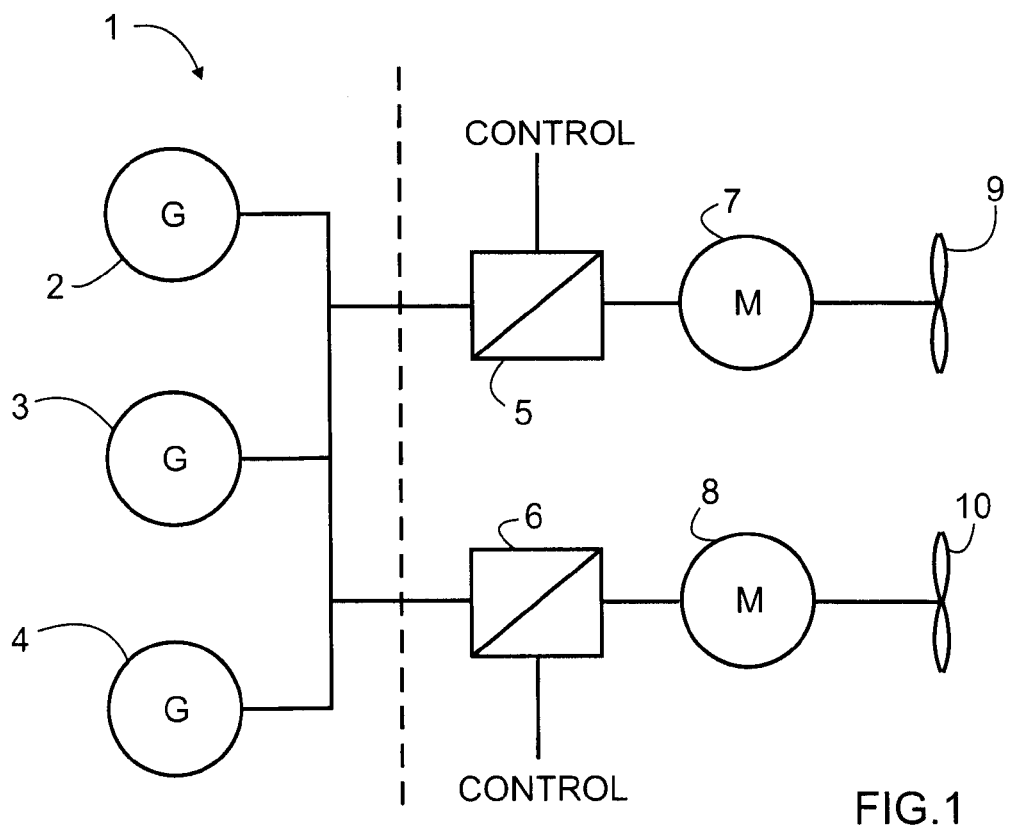
Figure 2:
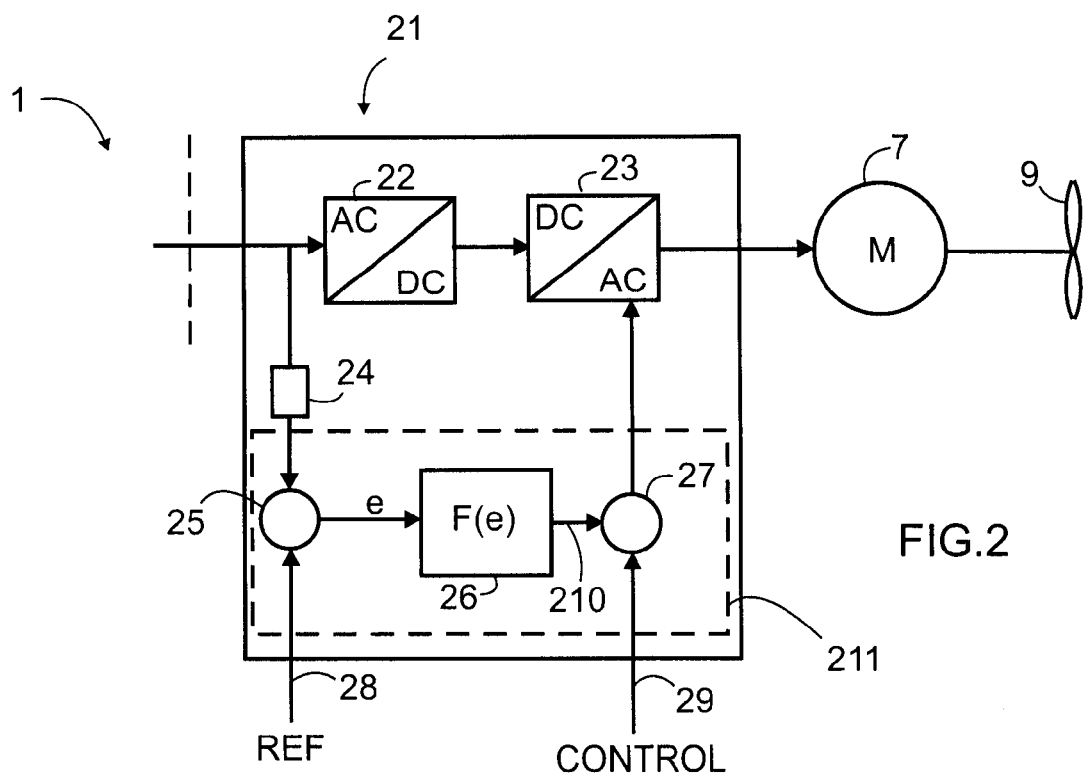
FIG. 2 illustrates an example of the apparatus according to embodiment of the invention.

FIG. 2 illustrates an example of the electric power supply apparatus. The electric power supply apparatus 21 of an electric motor comprises an AC/DC converter 22 (alternating current/direct current converter) and a DC/AC converter 23 (direct current/alternating current converter). The direct current sides of the converters are interconnected. The alternating current side of the DC/AC converter 23 can be controlled for forming the desired alternating current. The apparatus comprises a monitoring apparatus 24 for monitoring the frequency of the alternating current side of the AC/DC converter 22, a comparison means 25 for comparing the frequency of the monitoring apparatus 24 with the reference frequency 28, a compensating means 26 for forming a compensation control signal 210 as a response to the comparison of the comparison means 25 and a controller 27 for forming a control signal for the DC/AC converter 23 from an external setting signal 29 and the compensation control signal 210.

It can be seen from FIG. 2 that the AC/DC converter 22 is connected to the electric supply network 1 at its alternating current side and the DC/AC converter 23 is connected to the electric motor 7 at its alternating current side. The electric motor 7 is connected to rotate the propeller 9, i.e. the example shows a vessel environment.

For example, if one of the generators of the vessel suddenly develops a fault and it no more produces electric energy, the demand of the electric motors and other electric apparatuses of the vessel exceeds the electric agency produced by the generators of the vessel. Thereby the frequency of the electric network tends to decrease. In a smallish network the decrease of the frequency is fast, especially when the electric motors located behind the frequency converters can not compensate the fluctuations of the network frequency with their inertia.

The monitoring apparatus 24 of the electric power supply apparatus 21 detects the decrease of frequency. The comparison means 25 compares the detected frequency with the reference frequency 28. The reference frequency can be available externally to the electric power supply apparatus 21, i.e. from an external source, as shown in FIG. 2, or it can be arranged as an internal source in the electric power supply apparatus. The internal source can be, for example, a memory of the apparatus containing the data about the reference frequency. The reference frequency is the normal frequency of the electric network. Usually, 50 Hz is used in electric networks. One method is to arrange the comparison means 25 to form the difference between the frequency to be monitored and the reference frequency 28 as the value of the comparison.

The compensation means 26 forms a compensation control signal 210 as a response to the comparison signal of the comparison means 25. The controller 27 uses the compensation control signal for changing the control signal of the alternating current side of the DC/AC converter 23 for reducing the electric energy directed to the electric motor 7. (In this case the input of energy is reduced.) The purpose is to react immediately to a change of the frequency of the electric network in order to keep the electric network operational. This will allow winning enough time for the other generators of the electric network to replace the production of the faulty generator. The energy consumption of the electric motor 7 can be smoothly returned to a normal level while simultaneously increasing the production of the remaining generators. (The compensation signal tends to increase the amount of energy input.) The electric network is operational all the time and no detrimental power outages occur.

There is no reason to react on very small frequency changes in the electric network because they are quite normal during operation and they are not detrimental as such. It is thus preferable to arrange the compensation means 26 to use a certain threshold value or values so that the compensation means forms a compensation signal 210 as the comparison value of the comparison means 25 exceeds the threshold value.

The compensation signal can be linearly, non-linearly or dynamically dependent on the comparison value of the comparison means 25. For example, if the absolute value of the difference between the threshold value k and the difference e between the frequency to be monitored and the reference frequency 28 is the comparison signal, the compensation control signal can be formed directly therefrom by multiplying it with a certain multiplier, using it as the exponent of an exponent function or by derivating it in relation to time. Thus, the compensation control signal can be dependent on, for example, the derivate of the comparison value of the comparison means 25.

The controller 27 is arranged to form the control signal of the alternating current side of the DC/AC converter 23 from an external setting signal 29 and the compensation signal 210. The control signal can be formed so that the compensation control signal 210 is subtracted from the external setting signal 29 or the compensation control signal is added to the external setting signal. The subtraction is to reduce the input of electric energy to the electric motor and the addition is to increase the input of electric energy to the electric motor.

In FIG. 2 the comparison means 25, the compensation means 26 and the controller 27 are shown as separate units.

They can, however, be realized as e.g. separate electronic units or program units arranged to be executed in a processor unit located in the apparatus.

These means can also be carried out so that they are integrated into one unit 211. The unit limited by the dotted line in FIG. 2 shows this option. The comparison means 25, compensation means 26 and the controller 27 can be, for example, an ASIC circuit (Application Specific Integrated Circuit).

The electric energy introduction apparatus 21 according to the example thus directs electric energy to the load as needed and changes the amount of the directed energy in case there is a sufficiently large change in the frequency of the network. The purpose of changing the amount of directed energy is to have the energy production and energy demand of the network correspond with each other and to keep the network operational. In other words, the solution increases the fault resistance of the network.

Figure 3:
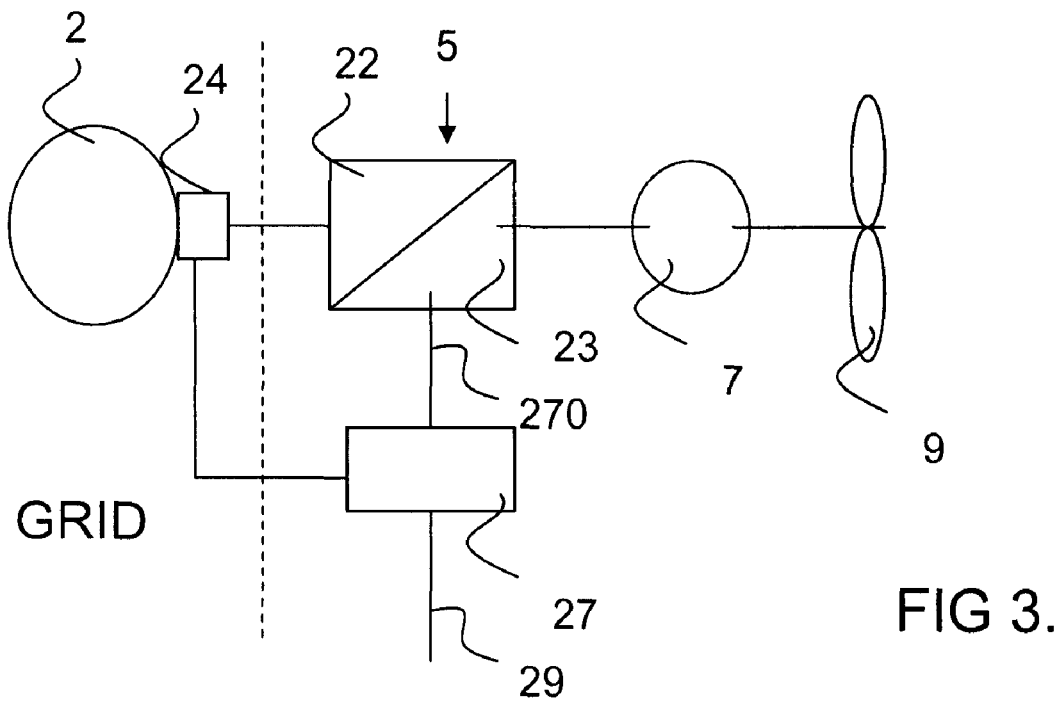
FIG. 3 illustrates second example of the apparatus according to embodiment of the invention.

FIG. 3 illustrates second example of the apparatus. It can be seen from FIG. 3 that the AC/DC converter 22 is connected to the electric supply network at its alternating current side and the DC/AC converter 23 is connected to the electric motor 7 at its alternating current side. The monitoring apparatus 24 monitors the frequency of the electric supply network wherein a converter 23 is connected. In this case the monitoring apparatus 24 is connected to a generator and determines the frequency by measuring the rotational speed of the generator.

A controller 27 has means, such as comparator, for identifying a frequency deviation between monitored frequency and a predetermined reference frequency by comparing the frequency monitored by the monitor 24 with the reference frequency 28. The reference frequency 28 is arranged in the controller 27 as an internal source.

The controller 27 is arranged in case of frequency deviation to control the power output of the converter 23 such, that the power output of the converter 23 is changed from the output determined by setting signal 29 of the converter 23. The controller 27 generates a control signal 270, which is delivered to the converter 23.

Figure 4:
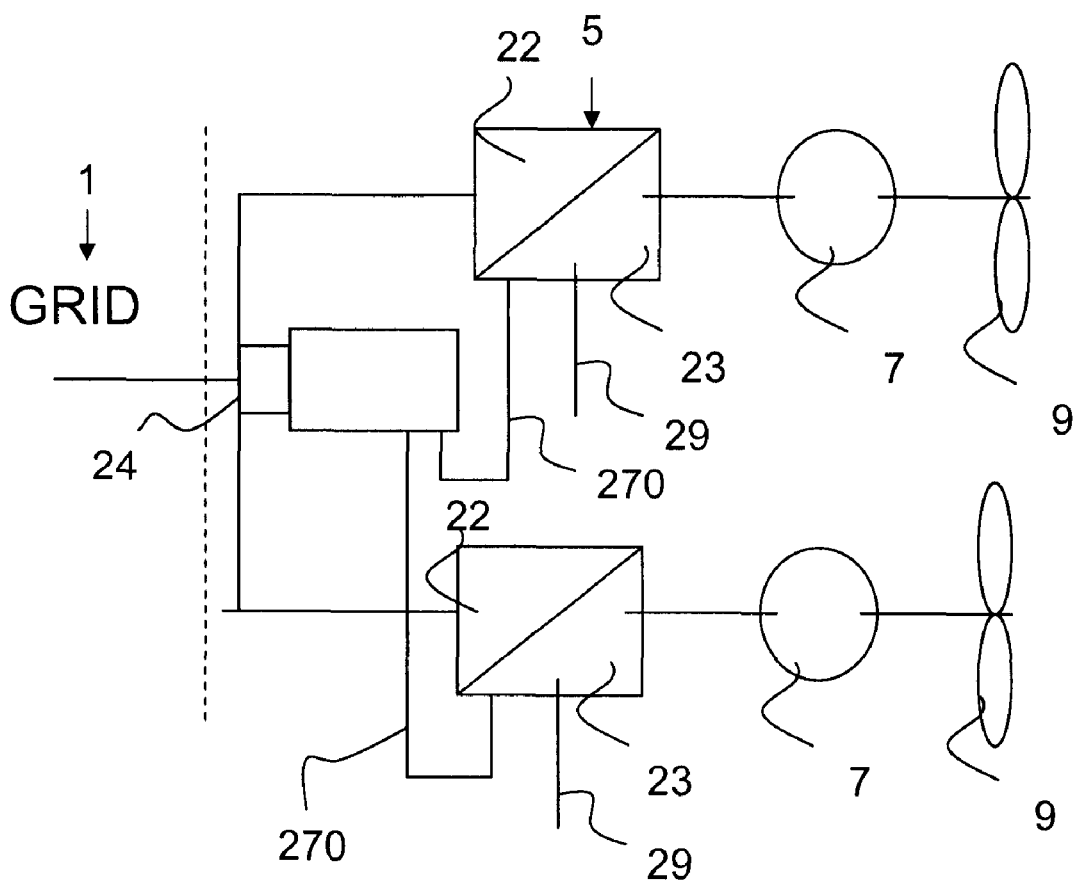
FIG. 4 illustrates third example of the apparatus according to embodiment of the invention.

FIG. 4 illustrates third example of the apparatus, wherein the monitoring apparatus 24 monitors the frequency of the electric supply network. In this case the monitoring apparatus 24 is connected to a grid and determines the frequency electric supply network. A controller has means, such as comparator, for identifying a frequency deviation between monitored frequency and a predetermined reference frequency by comparing the frequency monitored by the monitor 24 with the reference frequency. The controller is arranged in case of frequency deviation to control the power output of two converters 23 such, that the power output of two converters 23 is changed from the output determined by setting signal 29 of the converter 23. The controller 27 generates a control signal 270, which is delivered to the converter 23. The control signal 270 is send to the converter 23 as secondary setting signal, which is arranged to override the setting signal 29. This has an advantage in that controller can send the control signal 270 to one or more converters 23 at the time in periodic manner, thus distributing the effect of the change in power output to several applications.

Figure 5:
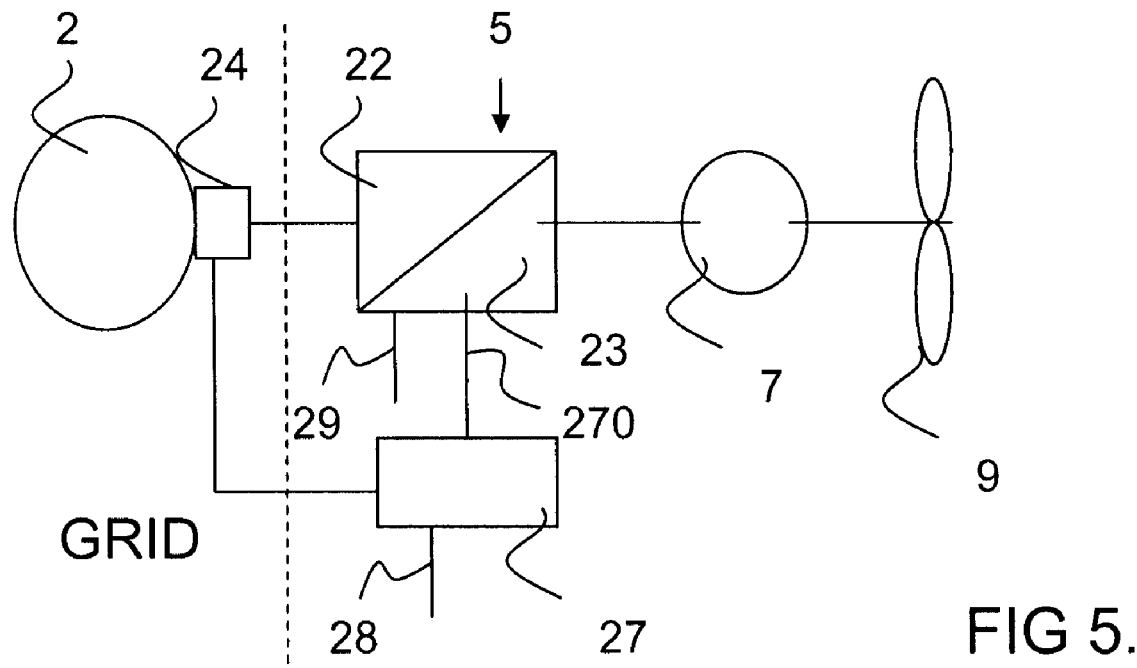
FIG. 5 illustrates fourth example of the apparatus according to embodiment of the invention.

FIG. 5 illustrates fourth example of the apparatus, which differs from FIG. 3 in that the control signal 270 is send to the converter 23 as secondary setting signal, which is arranged to override the original setting signal 29. The reference frequency 28 is arranged in the controller 27 as received signal from external source.

Figure 6:
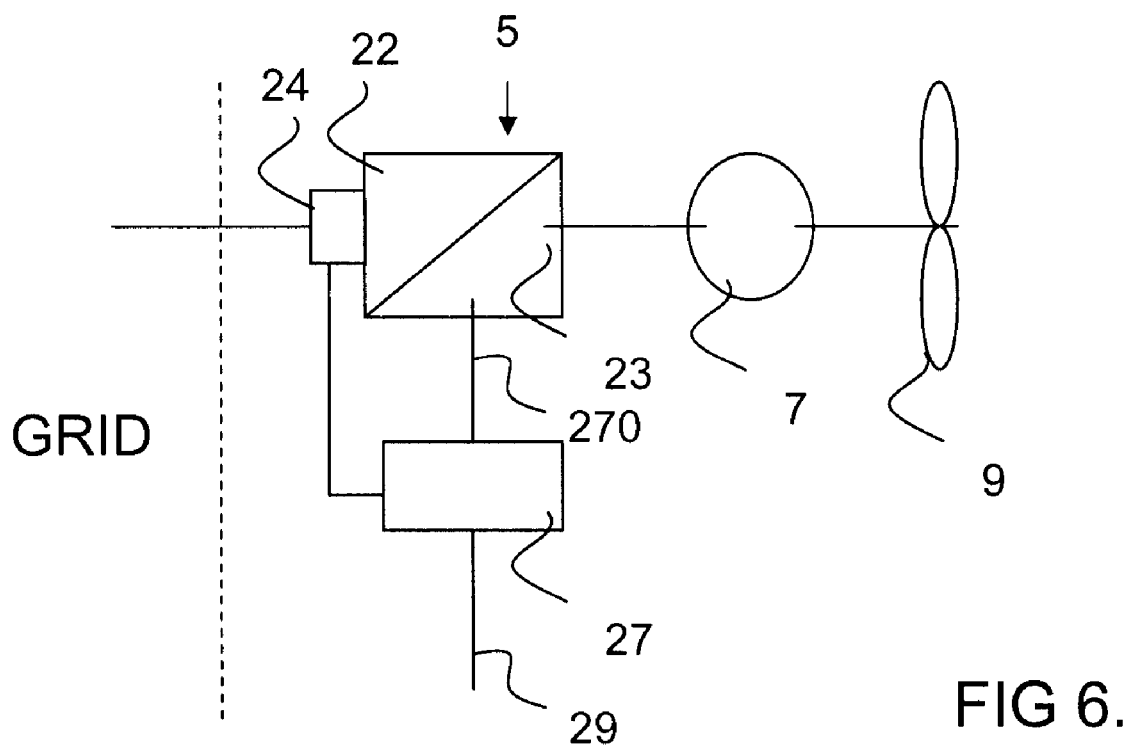
FIG. 6 illustrates fifth example of the apparatus according to embodiment of the invention.

FIG. 6 illustrates fifth example of the apparatus, which differs from FIG. 4 in that the setting signal 29 is converted to control signal 270. The functionality of the controller 27 can be implemented in frequency converter, as disclosed in FIG. 2.

In the light of the above description and its examples it is obvious that the embodiment according to the invention can be realized in a number of ways. It is obvious that the invention is not limited to the examples mentioned here, but that the invention can be realized by a number of different embodiments.

Thus, any inventive embodiment can be carried out within the scope of the invention.

The invention claimed is:

1. An electric power supply apparatus of an electric motor of a ship, the apparatus comprising an AC/DC converter and a DC/AC converter, the DC sides of the converters being interconnected and the alternating current side of the DC/AC converter being controllable for forming a desired alternating current, wherein the apparatus comprises a monitoring apparatus for monitoring the frequency of the alternating current side of the AC/DC converter, comparison means for comparing the frequency monitored by the monitoring apparatus with a reference frequency, compensation means for forming a compensation control signal as a response to the comparison of the comparison means and control signal means for forming a control signal for the alternating current side of the DC/AC converter from an external setting signal and the compensation control signal, the formed control signal being to change input of electric energy to the electric motor and thereby being to change energy demand of an electric network, in such a way that subtraction of the compensation control signal from the external setting signal the input of electric energy to the electric motor is reduced, and addition of the compensation control signal to the external setting signal the input of electric energy to the electric motor is increased.

2. The apparatus according to claim 1, wherein the compensation means is arranged to use a certain threshold value so that the compensation means forms a compensation control signal when the comparison value of the comparison means exceeds the threshold value.

3. The apparatus according to claim 2, wherein the compensation control signal is linearly dependent on the value of the comparison of the comparison means.

4. The apparatus according to claim 2, wherein the compensation control signal is non-linearly dependent on the value of the comparison of the comparison means.

5. The apparatus according to claim 2, wherein the compensation control signal is dependent on the derivate of the value of the comparison of the comparison means.

6. The apparatus according to claim 4, wherein the comparison means is arranged to form the difference between the frequency to be monitored and the reference frequency as the value of the comparison.

7. The apparatus according to claim 4, wherein the control signal means is arranged to subtract the compensation control signal from the setting signal or to add it thereto.

8. The apparatus according to claim 4, wherein the reference frequency is arranged to be available from an external source.

9. The apparatus according to claim 4, wherein the reference frequency is arranged in the electric power supply apparatus as an internal source.

10. The apparatus according to claim 4, wherein the comparison means, the compensation means and the control signal means are separate electronic circuits.

11. The apparatus according to claim 4, wherein the comparison means, the compensation means and the control signal means are program units designed to be executed in a processor unit.

12. The apparatus according to claim 4, wherein the comparison means, the compensation means and the control signal means are integrated into a single unit.

13. The apparatus according to claim 1, wherein the comparison means, the compensation means and the control signal means are an ASIC circuit.

* * * * *